Patented Oct. 18, 1932

1,882,977

UNITED STATES PATENT OFFICE

OTTO SCHMIDT AND GEORG NIEMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HYDROGEN

No Drawing. Application filed July 7, 1927, Serial No. 204,138, and in Germany July 31, 1926.

When gaseous aliphatic hydrocarbons and more especially methane itself are treated with steam at elevated temperatures in the presence of catalysts, the result is a mixture of hydrogen and carbon dioxide in which, according to the conditions of working, larger or smaller amounts of unaltered methane are contained. The state of equilibrium in this reaction is such that, at temperatures of 600° C., considerable quantities of methane are still present, even with an excess of steam. If it is desired to practically complete the reaction, the operation must be conducted either with a very large excess of steam at moderate temperatures, or very high temperatures 800° to 1000° C. must be employed. Both of these methods of working are unsuitable on an industrial scale.

We have now found that methane or other homologous gaseous aliphatic hydrocarbons such as ethane may be quantitatively transformed into hydrogen even at comparatively low temperatures, if the carbon dioxid is extracted from the gases having undergone the catalytic decomposition with steam by means of absorbents at sufficiently high temperature to prevent any condensation of water vapor and the resulting gas mixture is again subjected to catalytic decomposition followed by absorption of the carbon dioxide, said sequence of operations being repeated with the gases resulting from the absorption step so long as they contain any hydrocarbon. Suitable absorbents comprise such oxids as enable the absorption to be effected at elevated temperatures, especially above about 100° C., in order that the absorption may be carried out without previous expensive condensation of the water vapor. Use may be made of the oxids of metals the carbonates of which have a dissociation temperature which is not unduly high, in order that their regeneration may be facilitated. Oxids such as those of calcium, or mixtures thereof with the rare earths are suitable. Activating agents, such as the halides of the alkaline earths, may also be added to the absorbents.

The most suitable temperature for the absorption of the carbon dioxid varies according to the selection of oxids; in the case of lime, it is about 350° C., whereas the temperature of decomposition of the gaseous aliphatic hydrocarbons is from about 400 to 600° C. or over. The temperature of decomposition of calcium carbonate is rather high, so that it becomes a matter of local conditions as to whether the calcium carbonate is reconverted into calcium oxid by calcination, or is utilized in some other way.

The operation is preferably carried out in such a way that the decomposition of the gaseous aliphatic hydrocarbons is effected in stages, and the carbon dioxid is absorbed, at reduced temperature, after each stage. Both the decomposition of the gaseous hydrocarbons and the absorption of the carbon dioxid may be carried out under elevated pressure, if so desired, thereby enabling smaller apparatus to be used and effecting the absorption of the carbon dioxid under more satisfactory conditions, whilst on the other hand when working without the application of pressure, a quantitative reaction between gaseous aliphatic hydrocarbons and steam may be easily obtained at temperatures even below 600° C., the conversion being effected in this manner with particular smoothness and simplicity.

It is advisable to operate with purified gases, especially those which have been freed from sulfur.

The following example will further illustrate the nature of the said invention but the invention is not limited thereto.

Example

The reaction is carried on in a series of four chambers. The first and third chambers are charged with an activated nickel contact mass, such as is described in the Patent Application Ser. No. 174,427, filed March 10, 1927; whilst the second and fourth chambers contain fragments, about the size of lentils, of burnt lime.

The methane is first mixed with from 5 to 7 times the amount of steam theoretically necessary, and is admitted into the first chamber. The methane is there transformed, at 550° C., to such an extent that, after the carbon dioxid has been completely absorbed at a temperature of 350° C. in the second chamber, the gas consists of 97 per cent of hydrogen and 3 per cent of methane. The transformation of the remainder of the methane is effected at 550° C. in the third chamber, without any fresh admission of steam. The extraction of the newly formed carbon dioxid, in the fourth chamber, furnishes practically pure hydrogen.

What we claim is:

1. The process of substantially quantitatively converting gaseous aliphatic hydrocarbons into hydrogen, which comprises decomposing the said initial hydrocarbons with steam at about 400° to 600° C. and subsequently contacting the reaction gases with a carbon-dioxide absorbent at such high temperatures that no simultaneous condensation of water vapor takes place and then repeating the said operations with the gases resulting from the absorption step until practically all of the hydrocarbons are converted.

2. The process of substantially quantitatively converting methane into hydrogen, which comprises decomposing the methane with steam at a temperature of between about 400° and 600° C. in the presence of an activated nickel catalyst, then contacting the reaction gases with burnt lime at such high temperatures that only absorption of carbon dioxide takes place, but no condensation of water vapor, and then again subjecting the residual gas to catalytic decomposition in the aforesaid manner and absorbing the carbon dioxide in the same way.

3. The process of substantially completely converting methane into hydrogen, which comprising catalytically decomposing the methane with steam at about 550° C. in the presence of an activated nickel catalyst and then contacting the reaction gases with burnt lime at about 350° C. to absorb the carbon dioxide and then again subjecting the residual gas to catalytic decomposition in the aforesaid manner and absorbing the carbon dioxide in the same way.

4. The process of substantially completely converting gaseous aliphatic hydrocarbons into hydrogen, which comprises catalytically decomposing the said initial hydrocarbons with steam at a temperature of between about 400° and 600° C. and then contacting the reaction gases at such high temperatures that no simultaneous condensation of water vapor takes place with the aid of burnt lime activated by the addition of a halide of an alkaline earth metal to absorb carbon dioxide and then repeating the said operations with the gases resulting from the absorption step until practically all of the hydrocarbons are converted.

In testimony whereof we have hereunto set our hands.

OTTO SCHMIDT.
GEORG NIEMANN.